(12) United States Patent
Liu

(10) Patent No.: US 11,438,315 B1
(45) Date of Patent: Sep. 6, 2022

(54) METHODS, SYSTEMS, APPARATUSES, AND DEVICES FOR PROVIDING DURABLE FORWARD CONFIDENTIALITY DURING COMMUNICATIONS BETWEEN DEVICES

(71) Applicant: Lawrence Liu, Chesterfield, VA (US)

(72) Inventor: Lawrence Liu, Chesterfield, VA (US)

( * ) Notice: Subject to any disclaimer, the term of this patent is extended or adjusted under 35 U.S.C. 154(b) by 0 days.

(21) Appl. No.: 17/348,616

(22) Filed: Jun. 15, 2021

(51) Int. Cl.
  *H04L 9/32* (2006.01)
  *H04L 9/40* (2022.01)

(52) U.S. Cl.
  CPC ........ *H04L 63/0428* (2013.01); *H04L 9/3242* (2013.01); *H04L 63/061* (2013.01)

(58) Field of Classification Search
  CPC .. H04L 63/0428; H04L 63/061; H04L 9/3242
  USPC ........................................................ 713/171
  See application file for complete search history.

(56) References Cited

U.S. PATENT DOCUMENTS

| | | | | |
|---|---|---|---|---|
| 7,822,205 B2 * | 10/2010 | Ksontini | ................ | H04N 7/163 709/227 |
| 7,992,193 B2 * | 8/2011 | Maino | ................... | H04L 9/0841 713/181 |
| 8,989,374 B2 * | 3/2015 | Nagai | ....................... | G09C 1/00 713/168 |
| 9,071,416 B2 * | 6/2015 | Liu | ......................... | H04W 12/03 |
| 9,391,772 B2 * | 7/2016 | Suzuki | ................... | H04L 9/3278 |
| 9,917,692 B2 * | 3/2018 | Furukawa | ............. | H04L 9/3247 |
| 10,671,740 B2 * | 6/2020 | Bhattacharyya | ........ | G06F 21/74 |
| 11,139,967 B2 * | 10/2021 | Ouziel | ................ | G06F 9/45558 |
| 2008/0253567 A1 * | 10/2008 | Nakano | .................... | G06F 21/10 380/255 |
| 2015/0012339 A1 * | 1/2015 | Onischuk | ................ | G07C 13/00 235/386 |
| 2018/0350180 A1 * | 12/2018 | Onischuk | ................ | G07C 13/00 |
| 2019/0268145 A1 * | 8/2019 | Barth | ..................... | H04L 9/0838 |

* cited by examiner

*Primary Examiner* — Amare F Tabor

(57) ABSTRACT

Disclosed herein is a method for providing durable forward confidentiality during communications between devices, in accordance with some embodiments. Accordingly, the method may include receiving an ephemeral entropy source identifier and a bit range identifier from a first user device, encrypting the ephemeral entropy source identifier and the bit range identifier, generating a ciphertext, transmitting the ciphertext to a second user device, receiving the ciphertext from the second user device, decrypting the ciphertext, obtaining the ephemeral entropy source identifier and the bit range identifier, identifying an ephemeral entropy source and a bit range, capturing a content from a stream of the ephemeral entropy source, generating a secret key using the content, identifying the ephemeral entropy source and the bit range, capturing the content from the stream, and generating the secret key using the content.

20 Claims, 18 Drawing Sheets

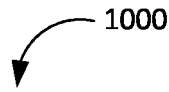

| H(x) | Return the result of one-way secure hash function for input x |
|---|---|
| L | List of ephemeral entropy sources |
| E | Selected entropy source |
| P | Parameters for sources in L |
| c | Parameters for capturing entropy bits from E |
| f | Frame size in bits |
| g | Length of synchronizer in bits. |
| $S_0$ | The offset within current captured frame that marks the starting point of a synchronized stream |
| d | Entropy bits offset from the synchronization starting point. |
| l | Length of entropy bits used to derive key extension. |
| r | Part of the meta information provided by a radio based EES. Reference to a cyclical counter for synchronized capturing of the entropy bits from a broadcasting source by different communication participants. The sequentially incrementing counter resets to zero once it reaches a predefined value to afford all communication parties enough preparation time to capture the same ephemeral entropy segment within a limited time window. |
| $Log_b(x)$ | The logarithm of x with respect to base b. |
| ln(x) | The natural logarithm. |
| n | A random secure nonce, a.k.a. the number used only once. |
| sk | The first shared secret key established via traditional public-key cryptosystem. |
| $\alpha\beta$ | Entropy bits harvested by Alice and Bob |
| S=(s1,...,SL) | A dataset that consists of an ordered collection of L samples, where $si \in A$. |
| [i, j] | Return the elements of an array or stream between position i and j, including elements at i and j. |
| \|\| | Concatenation. |

| Source | Being transient or ephemeral | Speed/Bit Rate | Subchannels/div | Delays | Capturing | Underlying Source | Usage |
|---|---|---|---|---|---|---|---|
| Live traffic data | The most granular data set is usually not persisted | Low | Some services may offer different endpoints for different geographic locations and jurisdictions. There could also be data steams for different layers. | Medium – High. | Active service calls over the Internet | Real-time traffic patterns created by human activities (TRNG) | Endpoint access across the Internet. Given its low bit rate it's recommended to be used in conjunction with other sources. |
| Dedicated high speed Entropy radio broadcast | Yes | Very High | Different frequencies across different bandwidth. Different time, code or frequency divisions etc. | Very Low | One-way Passive | Thermal noise, chaotic lasers etc. (TRNG) | This is the ideal EES for most use cases however it may be location limited depending on the range of the radio or satellite broadcast service available for the area. It's recommended to always have a backup EES in case of radio interference or poor reception caused by other conditions such as weather. |

| | | | | | | | |
|---|---|---|---|---|---|---|---|
| Live cam feeds | Depending on the provider | High | Usually no subchannels or substreams from a single source. But there are many live webcams around the world. | Low Usually in the range of a few seconds | Active Streaming | Live scenes or behaviors of the subject (TRNG) | Need to make sure all frames streamed are consistent across all clients (i.e. any frame skip needs to be consistent to all its consumers). Strongly recommend to be used in conjunction with other sources. |
| Live satellite or digital radio or TV broadcast | Mostly non-ephemeral. Requires careful vetting and selection are required | High | Different stations from different frequency ranges. | Low | One-way Passive | Depending on the program. | Not recommended to use |
| Financial market, lottery or blockchain data | Not ephemeral in almost all cases | | | | | | Must not be used |
| NIST Randomness Beacon services | Not ephemeral except custom services provided through private contract and endpoints | Varies | Requires the establishment of different services and endpoints | Low | Active service calls over the Internet | Physical (Quantum) Random Number Generator | The public service endpoints cannot be used as EES as entropy bits are persisted by default. |

FIG. 12

$\overset{\text{1400}}{\swarrow}$

| Step | Alice | | Bob |
|---|---|---|---|
| 1 | (Optional) Verify Bob's certificate if authentication is required for key exchange. | – –Initiate connection– → | Accept |
| 2 | Obtain shared secret key $sk$ | ← – RSA, DH or ECDH – → key exchange | Obtain shared secret key $sk$ |
| 3 | Generate list of preferred entropy source $L$ and corresponding parameters list $P$ | | |
| 4 | Generate a random secure nonce $n$ and pack it with $L$ and $P$ then encrypt the whole pack using key $sk$ | | |
| 5 | | – –Packet from step 4– → | Receive and decrypt using key $sk$ |
| 6 | | | Extract $L$, $P$, $n$ |
| 7 | | | Select preferred EES as $E$ and parameters as c based on entropy sources available at the time of exchange |
| 8 | | | Packs the selected $E$, $c$, $r$ and $n$ into a response packet |
| 9 | Accept and decrypt using key $sk$, then extract $E$, $c$, $r$, $n$ | ← – Encrypted $E$, $c$, $r$ and $n$ – – | Encrypt the packet from previous step using key $sk$ |
| 10 | Terminate the communication handshake if $n$ has changed | – – – – –x– – – – – Terminate connection if $n$ is different | |
| 11 | Retrieve f bits from $E$ as $\alpha$ where $f$ is the number of bits per frame defined in $c$ | | Retrieve f bits from $E$ as $\beta$ where $f$ is the number of bits per frame defined in $c$ |
| 12 | Obtain $M = H(\alpha[0, g\text{ -}1])$, $N = H(\alpha[f\text{-}g, f\text{-}1])$ | – – – – $M$ and $N$ – – – → | Received |

FIG. 14

| | | | |
|---|---|---|---|
| 13 | Receive and compare the returned hash to M and N | ←– – – -M or N- – – – – | Sequentially hashes g bits of data in his captured frame and look for a bit position that will produce a hash that matches M or N. If such position is found Bob marks it as the synchronization point $s_0$ in his E stream and sends the hash back to Alice. Otherwise repeat the process with next frame and new M and N sent from Alice. |
| 14 | Marks synchronization point $s_0$ in her E stream accordingly based on whether the hash matches M or N Repeat from step 11 if no response from Bob before timeout | | |
| 15 | Extract l bits from E at offset $(s_0 + d)$ to obtain $\alpha$ | | Extract l bits from E at offset $(s_0 + d)$ to obtain $\beta$ |
| 16 | Obtain $H_a = H(\alpha)$ | | Obtain $H_b = H(\beta)$ |
| 17, 18 | Send $H_a$ and Accept $H_b$ | ←– – – – – – – – – –→ Alice and Bob exchange $H_a$ and $H_b$ | Send $H_b$ and Accept $H_a$ |
| 19 | Error and fail the communication handshake if $H_a$ and $H_b$ are different | – – – – – –x– – – – – – Terminate connection if $H_a$ and $H_b$ are different | Error and fail the communication handshake if $H_a$ and $H_b$ are different |
| 20, 21 | Derive secret key $K_{ext}$ (as cryptographic pepper) from $\alpha$ | | Derive secret key $K_{ext}$ (as cryptographic pepper) from $\beta$ |
| 22 | Obtain the final shared secret session key $K = sk \mid\mid K_{ext}$ | | Obtain the final shared secret session key $K = sk \mid\mid K_{ext}$ |

FIG. 15

| Step | Alice | | Bob |
|---|---|---|---|
| 1 | (Optional) Verify Bob's certificate if authentication is required for key exchange. | – –Initiate connection– → | Accept |
| 2 | Obtain shared secret key $sk$ | ← – RSA, DH or ECDH – → key exchange | Obtain shared secret key $sk$ |
| 3 | Generate list of preferred entropy source $L$ and corresponding parameters list $P$ | | |
| 4 | Generate a random secure nonce $n$ and pack it with $L$ and $P$ then encrypt the whole pack using key $sk$ | | |
| 5 | | – –Packet from step 4– → | Receive and decrypt using key $sk$ |
| 6 | | | Extract $L, P, n$ |
| 7 | | | Select preferred EES as $E$ and parameters as c based on entropy sources available at the time of exchange |
| 8 | | | Packs the selected $E, c, r$ and $n$ into a response packet |
| 9 | | | Determine common entropy selection reference $r$ |
| 10 | Accept and decrypt using key $sk$ | ← – – – – – – – – – – Encrypted $E, c, r$ and $n$ | Encrypt the packet from previous step using key $sk$ |
| 11 | Extract $E, c, r, n$ and terminate the communication handshake if $n$ has changed | – – – – –x– – – – – Terminate connection if $n$ is different | |

FIG. 16

METHODS, SYSTEMS, APPARATUSES, AND DEVICES FOR PROVIDING DURABLE FORWARD CONFIDENTIALITY DURING COMMUNICATIONS BETWEEN DEVICES

FIELD OF THE INVENTION

Generally, the present disclosure relates to the field of data processing. More specifically, the present disclosure relates to methods, systems, apparatuses, and devices for providing durable forward confidentiality during communications between devices.

BACKGROUND OF THE INVENTION

Modern network security for banking, eCommerce, digital identity and privacy protection relies heavily on public-key cryptography and make extensive use of cryptosystems such as the Rivest-Shamir-Adleman (RSA), Elliptic-Curve Cryptography (ECC), and Diffie-Hellman based key exchanges in order to provide information confidentiality, integrity and authenticity assurance. The fundamental security of these cryptosystems is based on presumed difficulty in finding efficient solutions to certain well-known mathematical problems, namely the integer factorization problem, the discrete logarithm problem (DLP), and certain variants of the Diffie-Hellman problem (DHP). Consequently, the strength of today's Internet security is principally hinged on the assumed impracticality of solving these computational hard problems under the limits of current technologies and resources. While such assumption hasn't been publically proven to be untrue despite strong interest and extensive studies, they are nonetheless still assumptions in lieu of any definitive proof. In light of continued advancement in quantum computing, cryptanalysis, and fundamental mathematics, perspicacious entities may want to employ effective countermeasures before a potential breakthrough in the field could lead to the catastrophic collapse of a cryptosystem that we so deeply depend on today.

More disconcerting than accelerated advancement in quantum computing is the rapid reduction of digital storage cost, which makes it increasingly more feasible for governments, organizations, or even individuals to record encrypted communications now and save them for deciphering in the future. Since information often remains relevant or secretive for years or perhaps even decades after creation or transmission, the lack of durable forward confidentiality protection is a shrouded risk with grave consequences that has yet to be fully appreciated by the public at large.

Contrary to what the word "perfect" suggests, the so-called Perfect Forward Secrecy (PFS) described in existing key agreement schemes (e.g. IEEE 1363) is limited to protecting against key compromises but not the potential defeat of the underlying algorithms. Furthermore, most existing schemes of forward secrecy employ Diffie-Hellman (DH) or Elliptic-Curve Diffie-Hellman (ECDH) based key exchanges which incur considerable amount of performance penalty. Although a communication participant leveraging RSA-based key exchange generates the session key on its own then transmits it using RSA encryption to its peer, thus may be able to avoid such performance penalties. However, having session keys determined by a single party without the influence from all communication participants forbids the implementation of forward secrecy under existing known schemes.

Last but not least, unlike with symmetric-key ciphers where the recovery of the original plaintext protected with a sufficiently high entropy key is theoretically unfeasible without knowing the protecting key (information-theoretic security), asymmetric-key encryptions allow guaranteed recovery of the plaintext, as well as the private key since the ciphertext together with its public key already contain enough information despite the actual recovery process itself may still be impractical to implement using current technologies (computational security). This seemingly subtle, inconspicuous property of public key encryption has profound implications on durable confidentiality. This is the case even when the original plaintext is as short as the length of the encryption key. A defeat of the underlying public-key algorithm will likely make such deciphering of information gravely faster and trivial, and it could subsequently lead to crytocalypse if the general public fails to timely ameliorate the current PFS scheme to make sure it can truly endure future groundbreaking discoveries and live up to its name.

As such, there is a genuine need for improved methods, systems, apparatuses, and devices for providing durable forward confidentiality during communications between devices that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for providing durable forward confidentiality during communications between devices, in accordance with some embodiments. Accordingly, the method may include a step of receiving, using a first communication device, at least one ephemeral entropy source identifier of at least one ephemeral entropy source and at least one bit range identifier of at least one bit range associated with the at least one ephemeral entropy source from at least one first user device. Further, the method may include a step of encrypting, using a first processing device, the at least one ephemeral entropy source identifier and the at least one bit range identifier using at least one encryption scheme. Further, the method may include a step of generating, using the first processing device, a ciphertext based on the encrypting. Further, the method may include a step of transmitting, using the first communication device, the ciphertext to at least one second user device. Further, the method may include a step of receiving, using a second communication device, the ciphertext from the at least one second user device. Further, the method may include a step of decrypting, using a second processing device, the ciphertext. Further, the method may include a step of obtaining, using the second processing device, the at least one ephemeral entropy source identifier and the at least one bit range identifier based on the decrypting. Further, the method may include a step of identifying, using the second processing device, the at least one ephemeral entropy source and the at least one bit range based on the at least one ephemeral entropy source identifier and the at least one bit range identifier. Further, the method may include a step of capturing, using the second processing device, at least one content from at least one stream of the at least one ephemeral entropy source based on the identifying of the at least one ephemeral entropy source and the at least one bit range. Further, the at least one ephemeral entropy source may be configured for outputting the at least one stream. Further, the method may include a step of generating, using the second processing device, a secret key using the at least one content. Further, the method may include a step of identifying, using the first processing device, the at least one ephemeral entropy source and the at least one bit range based on the at least one ephemeral entropy source identifier and the at least one bit range identifier. Further, the method may include a step of capturing, using the first processing device, the at least one content from the at least one stream of the at least one ephemeral entropy source based on the identifying of the at least one ephemeral entropy source and the at least one bit range. Further, the method may include a step of generating, using the first processing device, the secret key using the at least one content.

Further disclosed herein is a system for providing durable forward confidentiality during communications between devices, in accordance with some embodiments. Accordingly, the system may include a first device and a second device. Further, the first device may include a first communication device and a first processing device. Further, the first communication device may be configured for receiving at least one ephemeral entropy source identifier of at least one ephemeral entropy source and at least one bit range identifier of at least one bit range associated with the at least one ephemeral entropy source from at least one first user device. Further, the first communication device may be configured for transmitting a ciphertext to at least one second user device. Further, the first processing device may be communicatively coupled with the first communication device. Further, the first processing device may be configured for encrypting the at least one ephemeral entropy source identifier and the at least one bit range identifier using at least one encryption scheme. Further, the first processing device may be configured for generating the ciphertext based on the encrypting. Further, the first processing device may be configured for identifying the at least one ephemeral entropy source and the at least one bit range based on the at least one ephemeral entropy source identifier and the at least one bit range identifier. Further, the first processing device may be configured for capturing at least one content from at least one stream of the at least one ephemeral entropy source based on the identifying of the at least one ephemeral entropy source and the at least one bit range. Further, the first processing device may be configured for generating a secret key using the at least one content. Further, the secret key may be used for at least one encrypting and decrypting one or more messages communicated between the at least one second user device and the at least one first user device. Further, the second device may include a second communication device and a second processing device. Further, the second communication device may be configured for receiving the ciphertext from the at least one second user device. Further, the second processing device may be communicatively coupled with the second communication device. Further, the second processing device may be configured for decrypting the ciphertext. Further, the second processing device may be configured for obtaining the at least one ephemeral entropy source identifier and the at least one bit range identifier based on the decrypting. Further, the second processing device may be configured for identifying the at least one ephemeral entropy source and the at least one bit range based on the at least one ephemeral entropy source identifier and the at least one bit range identifier. Further, the second processing device may be configured for capturing the at least one content from the at least one stream of the at least one ephemeral entropy source based on the identifying of the at least one ephemeral entropy source and the at least one bit range. Further, the at least one ephemeral entropy source may be configured for outputting the at least one stream. Further, the second processing device may be configured for generating the secret key using the at least one content. Further, the secret key may be used for at least one encrypting and decrypting the one or more messages communicated between the at least one first user device and the at least one second user device.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 10 is a table of notations, in accordance with some embodiments.

FIG. 11 is a table of entropy sources and attributes and characteristics of the entropy sources, in accordance with some embodiments.

FIG. 12 is the table of the entropy sources and the attributes and the characteristics of the entropy sources, in accordance with some embodiments.

FIG. 14 illustrates a key establishment process for Internet based entropy sources for providing durable forward confidentiality during the communications between the devices, in accordance with some embodiments.

FIG. 15 illustrates the key establishment process for the Internet based entropy sources, in accordance with some embodiments.

FIG. 16 illustrates a key establishment process for radio or satellite based entropy sources for providing durable forward confidentiality during the communications between the devices, in accordance with some embodiments.

DETAIL DESCRIPTIONS OF THE INVENTION

Figure 1:
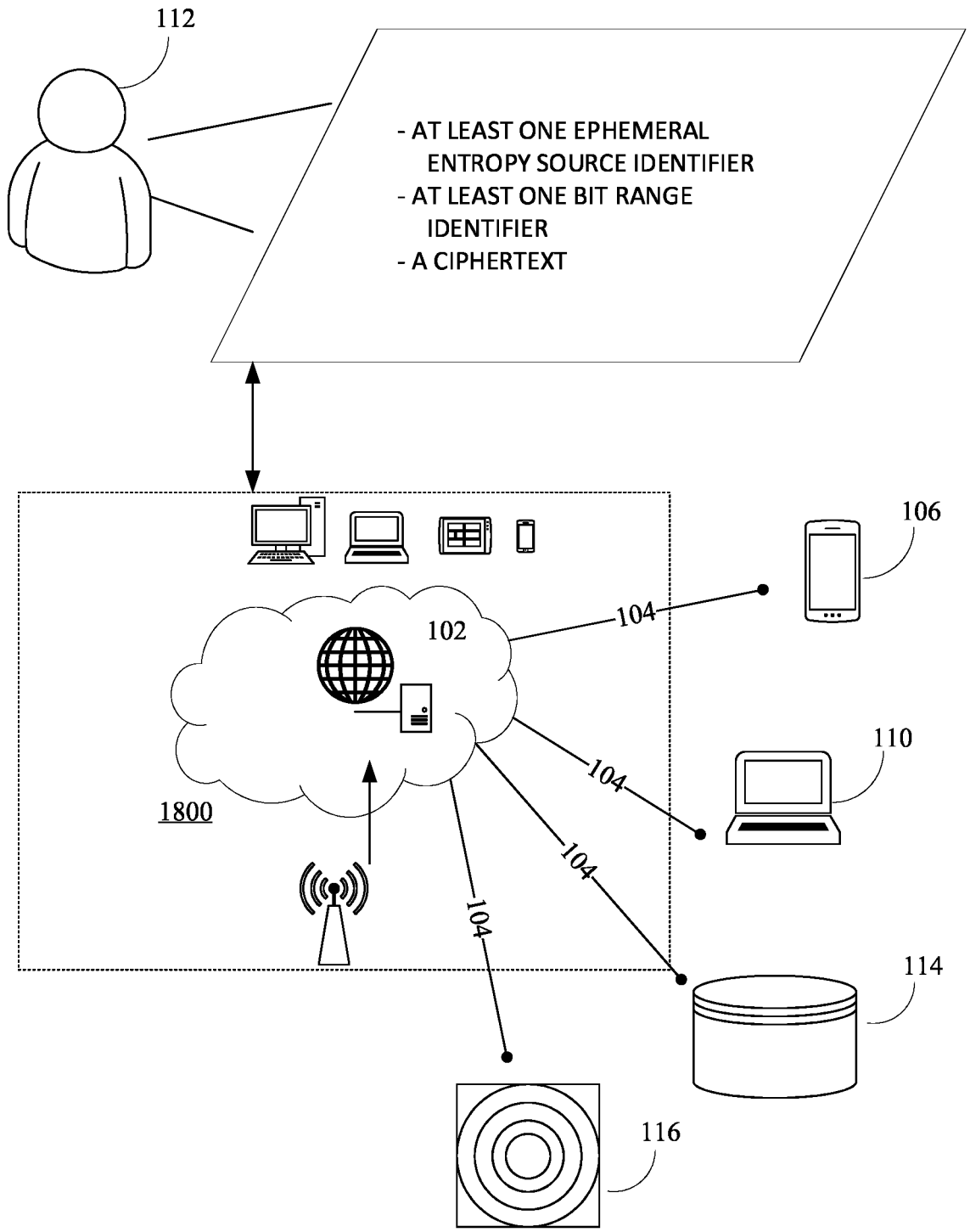
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for providing durable forward confidentiality during communications between devices, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

OVERVIEW

The present disclosure describes methods, systems, apparatuses, and devices for providing durable forward confidentiality during communications between devices. Further, the present disclosure describes methods, schemes, and apparatus that when implemented properly are able to provide durable forward confidentiality protection that could be capable of surviving the potential challenges brought by technological, mathematical as well as scientific advancement in the foreseeable future.

Further, the present disclosure describes an Ephemeral Entropy Source used for providing durable forward confidentiality during communications between the devices. Further, the ephemeral entropy source (EES) is designed to be commonly accessible to communication participants during the establishment of a secure channel Being ephemeral means the information bits emitted from such entropy sources (ephemeral entropy sources) are short-lived and are not persistence friendly to the extent that it is practically unfeasible to perform continuous, prolonged, indiscriminatory recording of such sources. Thus, when multiple entropy selectors are employed by the communication parties across a wide range of different channels, frequency spectrums, endpoints at different providers an adversary is left with a narrow window of timed opportunity that can only be seized if the adversary is able to compromise in near real-time the key negotiation exchanges protected with current public-key cryptography. A defeat of the public-key cryptosystem in the future will not help the adversary to recover crucial key information used for encrypting session exchanges. The transient nature of such entropy sources causes a missed attack within a given time window to permanently lose information, resulting in a theoretically irrecoverable ciphertext, assuming the entropic ratio of key to plaintext is large enough. A critical factor to the security of the present disclosure is the quality of the entropy sources, which should possess at least the following attributes when implemented:

Being transient or ephemeral—Information from the source must be short-lived and vanish quickly. Data such as financial market tickers are not ephemeral.

High speed—Bit rate (bps) of the stream must be high enough to render any recording and persisting attempt infeasible.

Support multi-channel, multi-endpoint concurrent access over a diverse set of mediums, frequencies, bands, IP addresses, ports, intermediaries, or protocols, etc.

Limited delays to all consumers (within the threshold of a few seconds) to ensure successful synchronization between communication peers.

The communication should be arranged in such a way that in order to not miss a key information an adversary must be able to break public-key encryption in near real-time so the relevant entropy from the selected sources can be captured for future decryption. Over-the-air radio is the preferred method since it allows the communication participants to passively harvest entropy bits off of radio waves without feedback and thus making such EES use theoretically untraceable. In contrast, accessing EES over the Internet should be done with extra care in order to avoid targeted monitoring or eavesdropping.

Rather than using deterministic Pseudo-Random Number Generators (PRNGs) as the underlying engine, True Random Number Generators (TRNGs) based on non-deterministic physical events such as the decay of certain radioactive elements, thermal noise emitted by components in electronic circuits, shot noise of subatomic particles or other quantum phenonmenas should be used instead. Entropy harvested from physical hardware usually needs to be debiased in order to attain near-uniform probability distribution.

Consistent output to all clients for a given time when same consumption parameters are used. Certain live webcams may skip different frames when streaming to different clients which will make them unsuitable as EES.

Further, the present disclosure describes methods for leveraging conventional EES over the Internet, schemes for establishing and consuming dedicated EES over radio or satellite broadcast, or the combination of both.

Further, the present disclosure describes active entropy sources that are accessed over the Internet. While randomness beacon services promoted by organizations such as NIST or League of Entropy may be able to provide good quality entropy bits, services offered as a public utility not only publicly announce entropy generated but will also permanently store them, making such services nonephemeral thus unsuitable as EES. However, with careful planning, multiple private transient entropy sources may be used in concert as a single EES either in place of or in addition to a radio based EES.

Further, the present disclosure describes the passive reception of dedicated radio or satellite entropy broadcast. Sources may use radio or satellite to broadcast entropy bits to allow communication participants to passively extract entropy bits from pervasive radio waves. This one-way ubiquitous delivery medium makes the consumption of such entropy sources theoretically impossible to detect and intercept.

Further, the present disclosure describes synchronization mechanisms. To each communication participant, the entropy bits harvested from EES form a set of values in time series. Because different harvesting methods may have different delays for different consuming clients, a synchronization mechanism must be employed to ensure all communication participants can derive same encryption key extension at the end of their key negotiation. To maximize the benefits afforded by the various types of EES the present invention discloses two different synchronization strategies. For Internet based EES, frame marker (a.k.a. synchronizer or sync sequence) hashes are used to synchronize two clients consuming the same stream. The byte length of a frame may vary according to the throughput of the EES to maintain a near constant time window per frame. For radio or satellite based EES, cyclical counters may be used as meta information of the broadcast to allow communication participants to directly reference the selected entropy bits so that the number of steps involved during key negotiation may be reduced.

The synchronization operations for each EES type are reflected in the steps of the respective entropy selection process for key establishment below. Given the various types of EES and the different methods of capturing them communicating parties must be able to follow a common protocol to mutually agree on the entropy selected. The present invention discloses a scheme that may be used for such purpose as a part of session key exchange.

Entropy Selection and Session Key Extension Scheme for Internet Based Sources:

1. Party A(lice) initiates the communication by making a connection to party B(ob).
2. Alice and Bob establish a shared secret key (sk) using a predefined public-key cryptographic scheme such as Rivest-Shamir-Adleman (RSA), Diffie-Hellman (DH), or Elliptic Curve Diffie-Hellman (ECDH).
3. Alice generates a list of her preferred ephemeral entropy sources (L) along with a list of preferred parameters (frame size, entropy offset, entropy length, etc.) P for each source.
4. Alice packs L and P generated in the previous step together with a random secure nonce (n) then encrypts the packet using a predefined symmetric-key cipher and the secret key sk.
5. Alice sends the encrypted packet to Bob who decrypts the payload using the same secret key sk.
6. Bob extracts the L, P, and n from the decrypted payload.
7. Bob selects his preferred EES as E and parameters as c from the decrypted L and P based on the entropy sources available in his environment at the time of the exchange.
8. Bob packs the selected E, c, and n into a response packet.
9. Bob encrypts the response packet using the predefined symmetric-key cipher and the secret key sk then sends the ciphertext back to Alice, who can decrypt the ciphertext from Bob using the same sk and extracts E, c, and n.
10. Alice then compares the extracted n to the one she initially generated and fails the communication handshake if any mismatch is found.
11. Alice and Bob both retrieve f bits from E where f is the number of bits per frame defined in c.
12. Alice hashes the first g bits of her captured frame as M and the last g bits of the frame as N. Alice sends Bob M and N.
13. Bob sequentially hashes g bits of data in his captured frame and looks for a bit position that will produce a hash that is identical to either M or N. If such position is found Bob marks it as the synchronization point $s_0$ in his E stream and sends the hash back to Alice. Otherwise, Bob will repeat the process with the next frame and new M and N sent from Alice.
14. Alice repeats the steps from 11 if she does not receive a hash back from Bob. Otherwise, she marks the synchronization point $s_0$ in her E stream accordingly based on whether the hash matches M or N.
15. Alice and Bob extract l bits from their respective E at offset ($s_0$+d) to obtain $\alpha$ and $\beta$
16. Alice and Bob hash $\alpha$ and $\beta$ extracted from the previous step into $H_a$ and $H_b$ respectively.
17. Alice sends $H_a$ to Bob.
18. Bob sends $H_b$ to Alice.

19. Upon receiving each other's hash Alice and Bob both make sure $H_a=H_b$ hence $\alpha=\beta$, otherwise fail the handshake of the communication with a proper error.
20. Alice generates a secret key $K_{ext}$ (as cryptographic pepper) based on the $\alpha$.
21. Bob can generate the same secret key $K_{ext}$ (as cryptographic pepper) based on $\beta$ which has been verified above to be equal to $\alpha$.
22. Alice and Bob obtain the final shared secret session key $K=sk \parallel K_{ext}$.

Entropy Selection Scheme for Radio or Satellite Based Sources:
1. Party A(lice) initiates the communication by making a connection to party B(ob).
2. Alice and Bob establish a shared secret key (sk) using a predefined public-key cryptographic scheme such as Rivest-Shamir-Adleman (RSA), Diffie-Hellman (DH), or Elliptic Curve Diffie-Hellman (ECDH).
3. Alice generates a list of her preferred ephemeral entropy sources (L) along with a list of preferred parameters (frame size, entropy offset, entropy length, etc.) P for each source.
4. Alice packs L and P generated in the previous step together with a random secure nonce (n) then encrypts the packet using a predefined symmetric-key cipher and the secret key sk.
5. Alice sends the encrypted packet to Bob who decrypts the payload using the same secret key sk.
6. Bob extracts the L, P, and n from the decrypted payload.
7. Bob selects his preferred EES as E and parameters as c from the decrypted L and P based on the entropy sources available in his environment at the time of the exchange.
8. Bob monitors the cyclical synchronization counter of E and decides a common entropy selection reference r for Bob and Alice to capture entropy bits at a calculated time within a given cycle.
9. Bob packs the selected E, c, r, and n into a response packet.
10. Bob encrypts the response packet using a predefined symmetric-key cipher and the secret key sk, then sends the ciphertext back to Alice who can then decrypt the ciphertext from Bob using the same sk.
11. Alice extracts E, c, r, and n from the data decrypted in the previous step then compares the extracted n to the one she initially generated and fails the communication handshake if any mismatch is found.
12. Alice monitors the cyclical synchronization counter of E and captures 1 bits referenced by r from E as $\alpha$.
13. Meanwhile, Bob also monitors the cyclical synchronization counter of E and captures 1 bits referenced by r from E as $\beta$.
14. Alice and Bob hash $\alpha$ and $\beta$ extracted from the previous into $H_a$ and $H_b$ respectively.
15. Alice sends $H_a$ to Bob.
16. Bob sends $H_b$ to Alice.
17. Upon receiving each other's hash Alice and Bob both make sure $H_a=H_b$ hence $\alpha=\beta$, otherwise fail the handshake of the communication with a proper error.
18. Alice generates a secret key $K_{ext}$ (as cryptographic pepper) based on the $\alpha$.
19. Bob can generate the same secret key $K_{ext}$ (as cryptographic pepper) based on $\beta$ which has been verified above to be equal to $\alpha$.
20. Alice and Bob obtain the final shared secret session key $K=sk \parallel K_{ext}$.

Further, the disclosed methods and systems are capable of providing durable forward confidentiality due to the fact that the session keys used by the symmetric cipher for encrypting actual communication exchanges not only contain the secret established following the traditional key exchange protocol but also a key extension that is based on ephemeral entropy bits which can only be captured if the secret exchange protected by the public-key cryptography is compromised in real-time. To resist interception of entropy retrieval this invention discloses a method using over-the-air radio broadcast for communication parties to passively retrieve entropy bits without emitting detectable effect to an outside observer. To prevent the archival of all entropy bits from EES this invention discloses the necessary attributes an EES must possess, including high bitrate and the transient nature of the source output (TRNGs are used to ensure true and non-repeatable randomness). For communication participants to mutually select and confirm the use of same entropy based key extension while without actually transmitting it over the communication channel this invention discloses the use of cyclical synchronization references as well as an entropy selection protocol to ensure a reliable handshake process between communicating parties.

Further, the present disclosure describes using EES to derive encryption key extensions (as cryptographic peppers) to provide durable forward confidentiality.

Further, the present disclosure describes using schemes disclosed in this invention as an additional key extensions to keys generated following existing key exchange schemes. This means that even a deficient implementation of the present disclosure could not have made the subject system less secure than systems that didn't implement the present disclosure.

Further, the present disclosure describes an entropy source selection and agreement scheme that does not involve transmitting the actual selected entropy over the network.

Further, the present disclosure describes synchronization methods that allow communication participants to independently capture the same entropy bits in near real-time.

Further, the present disclosure describes using over-the-air radio to broadcast entropy, which enables communication participants to passively harvest entropy in order to effectively resist third-party interception or eavesdropping.

FIG. 1 is an illustration of an online platform 100 consistent with various embodiments of the present disclosure. By way of non-limiting example, the online platform 100 to provide durable forward confidentiality during communications between devices may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1800.

Figure 2:
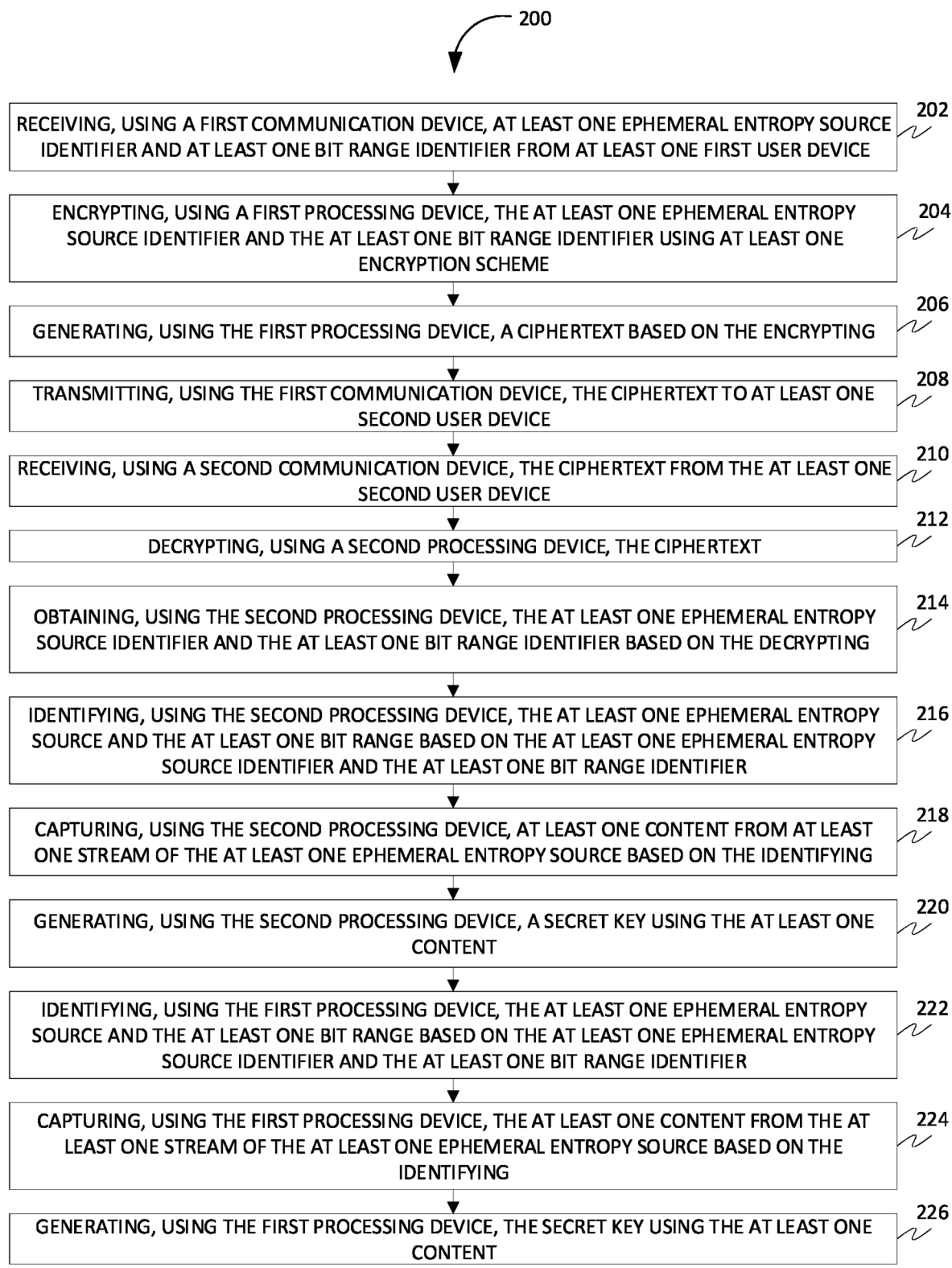
FIG. 2 is a flowchart of a method for providing durable forward confidentiality during communications between devices, in accordance with some embodiments.

FIG. 2 is a flowchart of a method 200 for providing durable forward confidentiality during communications between devices, in accordance with some embodiments. Further, at 202, the method 200 may include receiving, using a first communication device, at least one ephemeral entropy source identifier of at least one ephemeral entropy source and at least one bit range identifier of at least one bit range associated with the at least one ephemeral entropy source from at least one first user device. Further, the at least one ephemeral entropy source identifier may include at least one source indication of the at least one ephemeral entropy source. Further, the at least one bit range may include at least one time indication of a time instance and a duration of time. Further, the duration of time may include a number of seconds, a number of minutes, etc. Further, the at least one first user device may include a computing device such as a smartphone, a smartwatch, a tablet, a desktop, a laptop, and so on. Further, in an instance, the at least one first user device comprises an input device, an input-output device, etc.

Further, at 204, the method 200 may include encrypting, using a first processing device, the at least one ephemeral entropy source identifier and the at least one bit range identifier using at least one encryption scheme. Further, the at least one encryption scheme may include a predefined public-key cryptographic scheme such as Rivest-Shamir-Adleman (RSA), Diffie-Hellman (DH), Elliptic Curve Diffie-Hellman (ECDH), and so on.

Further, at 206, the method 200 may include generating, using the first processing device, a ciphertext based on the encrypting.

Further, at 208, the method 200 may include transmitting, using the first communication device, the ciphertext to at least one second user device. Further, the at least one second user device may include a computing device such as a smartphone, a smartwatch, a tablet, a desktop, a laptop, and so on. Further, in an instance, the at least one second user device comprises an input device, an input-output device, etc.

Further, at 210, the method 200 may include receiving, using a second communication device, the ciphertext from the at least one second user device. Further, at 212, the method 200 may include decrypting, using a second processing device, the ciphertext.

Further, at 214, the method 200 may include obtaining, using the second processing device, the at least one ephemeral entropy source identifier and the at least one bit range identifier based on the decrypting.

Further, at 216, the method 200 may include identifying, using the second processing device, the at least one ephemeral entropy source and the at least one bit range based on the at least one ephemeral entropy source identifier and the at least one bit range identifier.

Further, at 218, the method 200 may include capturing, using the second processing device, at least one content from at least one stream of the at least one ephemeral entropy source based on the identifying of the at least one ephemeral entropy source and the at least one bit range. Further, the at least one ephemeral entropy source may be configured for outputting the at least one stream. Further, the at least one stream may include an audio stream, a video stream, an audio video stream, a content stream, etc. Further, the at least one content may include a number of bits from the at least one stream.

Further, at 220, the method 200 may include generating, using the second processing device, a secret key using the at least one content. Further, the secret key may be used for at least one encrypting and decrypting one or more messages communicated between the at least one first user device and the at least one second user device.

Further, at 222, the method 200 may include identifying, using the first processing device, the at least one ephemeral entropy source and the at least one bit range based on the at least one ephemeral entropy source identifier and the at least one bit range identifier.

Further, at 224, the method 200 may include capturing, using the first processing device, the at least one content from the at least one stream of the at least one ephemeral entropy source based on the identifying of the at least one ephemeral entropy source and the at least one bit range.

Further, at 226, the method 200 may include generating, using the first processing device, the secret key using the at least one content. Further, the secret key may be used for at least one encrypting and decrypting the one or more messages communicated between the at least one second user device and the at least one first user device.

Further, in some embodiments, the at least one ephemeral entropy source may include at least one true random number generator (TRNG). Further, the at least one true random generator may be configured for generating the at least one stream with non-repeatable randomness. Further, the outputting of the at least one stream may be based on the generating of the at least one stream.

Further, in some embodiments, the at least one ephemeral entropy source may be associated with at least one bit rate. Further, the outputting of the at least one stream may include outputting the at least one stream with the at least one bit rate. Further, the at least one bit rate substantially equivalent to a maximum bit rate allowed by at least one channel used by the at least one ephemeral source for the outputting of the at least one stream.

Further, in some embodiments, the capturing of the at least one content may include passively capturing the at least one content from the at least one stream of the at least one ephemeral entropy source. Further, the passively capturing of the at least one content does not emit an effect to third-party observers.

Further, in some embodiments, the at least one ephemeral entropy source may include an active entropy source. Further, the active entropy source may be configured for generating the at least one stream. Further, the outputting of the at least one stream may be based on the generating of the at least one stream.

Further, in some embodiments, the at least one ephemeral entropy source may include a passive entropy source. Further, the passive entropy source may be configured for broadcasting the at least one stream using pervasive radio waves. Further, the outputting of the at least one stream may be based on the broadcasting.

Figure 3:
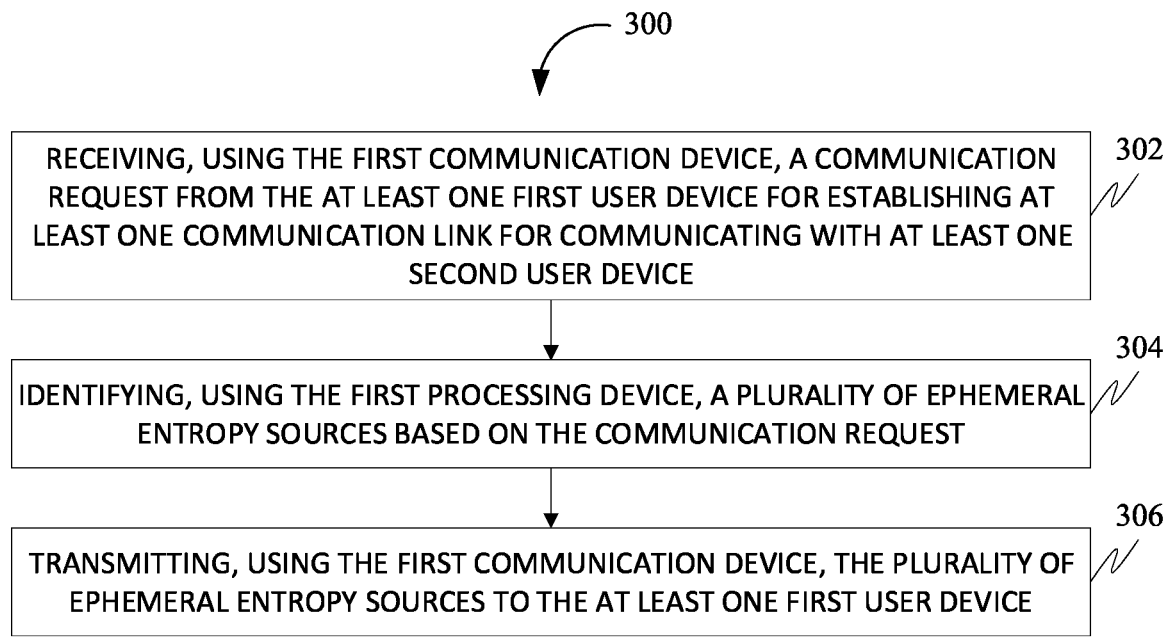
FIG. 3 is a flowchart of a method for facilitating selecting the at least one epithermal entropy source, in accordance with some embodiments.

FIG. 3 is a flowchart of a method 300 for facilitating selecting the at least one epithermal entropy source, in accordance with some embodiments. Further, at 302, the method 300 may include receiving, using the first communication device, a communication request from the at least one first user device for establishing at least one communication link for communicating with at least one second user device.

Further, at 304, the method 300 may include identifying, using the first processing device, a plurality of ephemeral entropy sources based on the communication request.

Further, at 306, the method 300 may include transmitting, using the first communication device, the plurality of ephemeral entropy sources to the at least one first user device. Further, the receiving of the at least one ephemeral entropy source identifier of the at least one ephemeral entropy source of the plurality of ephemeral entropy sources may be based on the transmitting of the plurality of ephemeral entropy sources.

Figure 4:
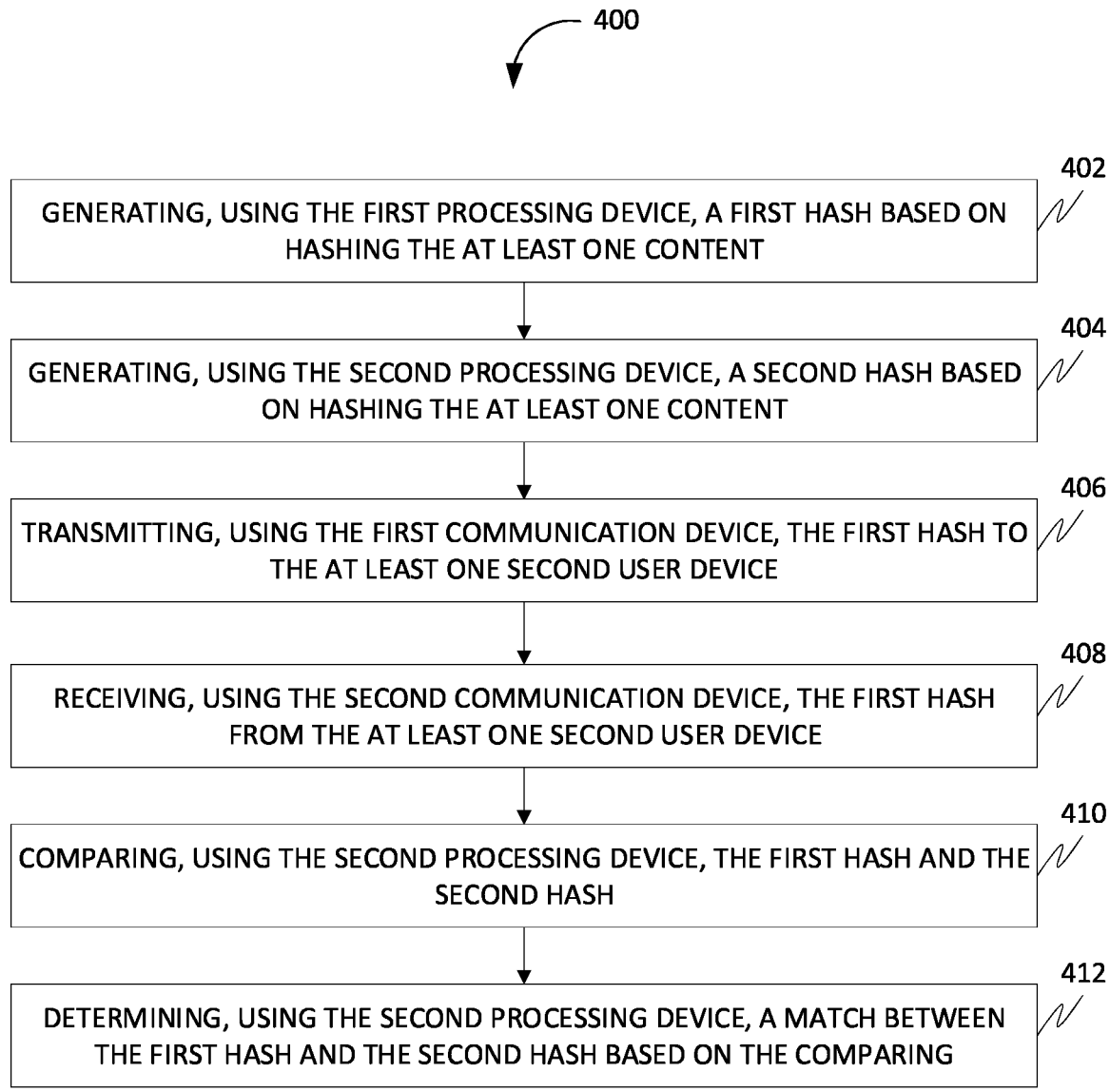
FIG. 4 is a flowchart of a method for facilitating confirming the at least one content captured by a first device of the devices, in accordance with some embodiments.

FIG. 4 is a flowchart of a method 400 for facilitating confirming the at least one content captured by a first device of the devices, in accordance with some embodiments. Further, at 402, the method 400 may include generating, using the first processing device, a first hash based on hashing the at least one content.

Further, at 404, the method 400 may include generating, using the second processing device, a second hash based on hashing the at least one content.

Further, at 406, the method 400 may include transmitting, using the first communication device, the first hash to the at least one second user device.

Further, at 408, the method 400 may include receiving, using the second communication device, the first hash from the at least one second user device.

Further, at 410, the method 400 may include comparing, using the second processing device, the first hash and the second hash.

Further, at 412, the method 400 may include determining, using the second processing device, a match between the first hash and the second hash based on the comparing. Further, the generating of the secret key using the at least one content may be based on the determining of the match.

Figure 5:
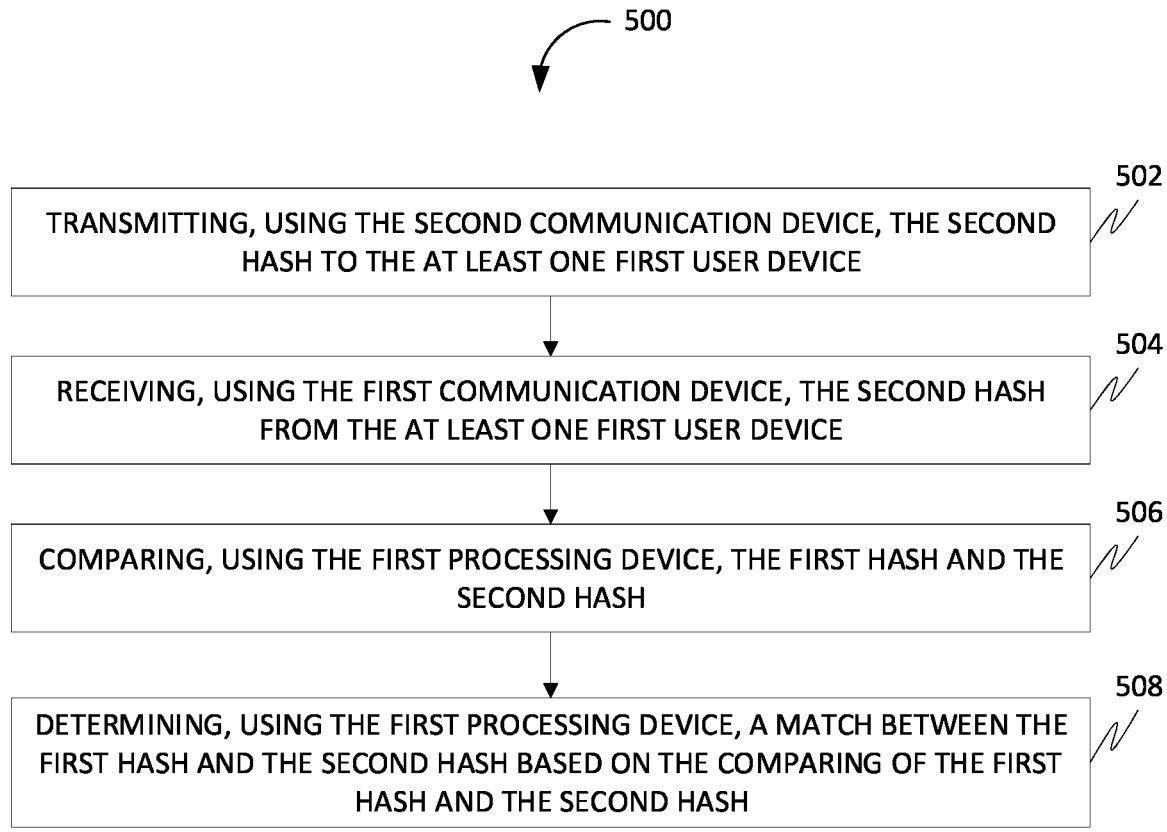
FIG. 5 is a flowchart of a method for facilitating confirming the at least one content captured by a second device of the devices, in accordance with some embodiments.

FIG. 5 is a flowchart of a method 500 for facilitating confirming the at least one content captured by a second device of the devices, in accordance with some embodiments. Further, at 502, the method 500 may include transmitting, using the second communication device, the second hash to the at least one first user device.

Further, at 504, the method 500 may include receiving, using the first communication device, the second hash from the at least one first user device.

Further, at 506, the method 500 may include comparing, using the first processing device, the first hash and the second hash.

Further, at 508, the method 500 may include determining, using the first processing device, a match between the first hash and the second hash based on the comparing of the first hash and the second hash. Further, the generating of the secret key using the at least one content may be based on the determining of the match.

Figure 6:
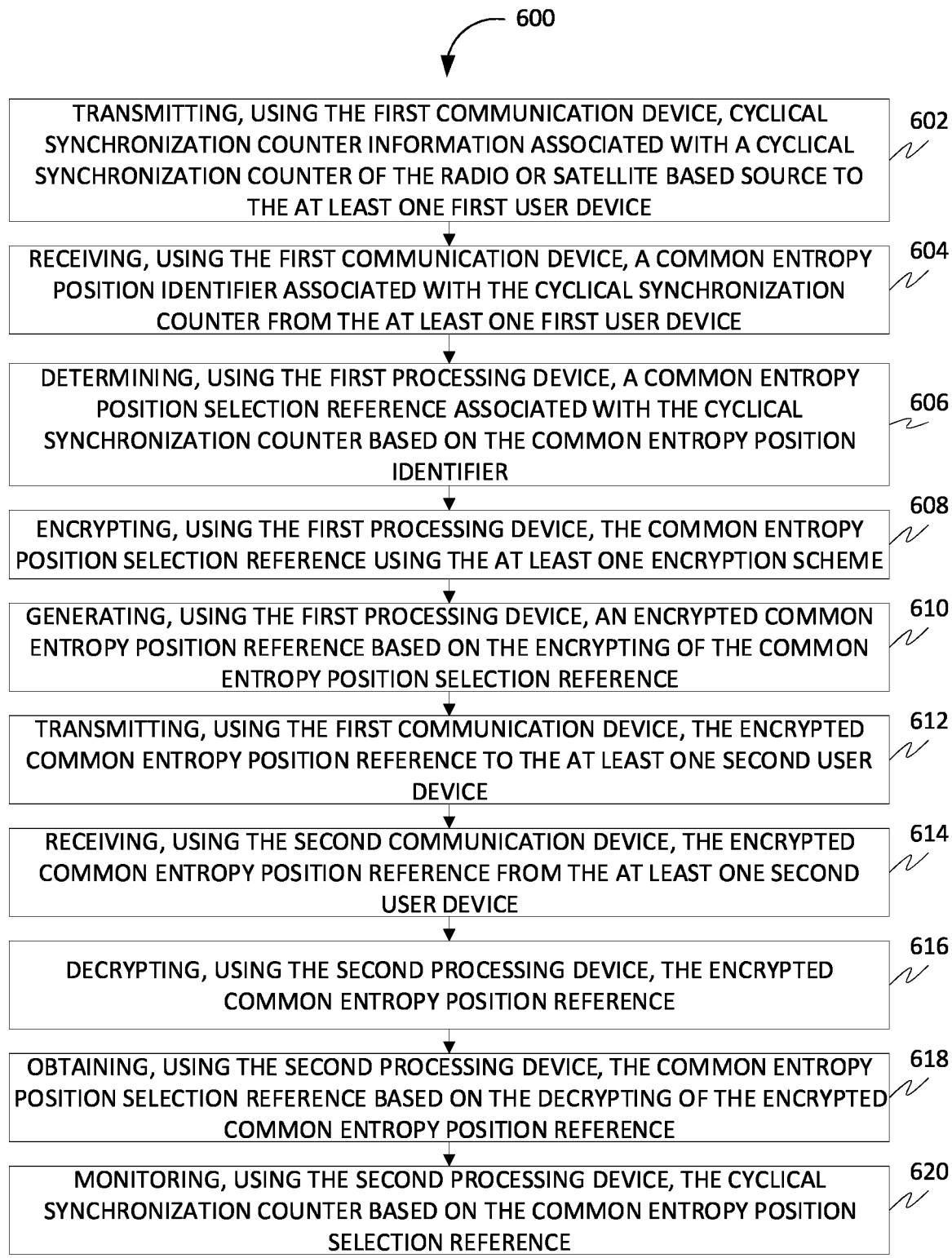
FIG. 6 is a flowchart of a method for facilitating synchronization between the devices for the capturing of the at least one content, in accordance with some embodiments.

FIG. 6 is a flowchart of a method 600 for facilitating synchronization between the devices for the capturing of the at least one content, in accordance with some embodiments. Further, the at least one ephemeral source may include a radio or satellite based source. Further, at 602, the method 600 may include transmitting, using the first communication device, cyclical synchronization counter information associated with a cyclical synchronization counter of the radio or satellite based source to the at least one first user device.

Further, at 604, the method 600 may include receiving, using the first communication device, a common entropy position identifier associated with the cyclical synchronization counter from the at least one first user device.

Further, at 606, the method 600 may include determining, using the first processing device, a common entropy position selection reference associated with the cyclical synchronization counter based on the common entropy position identifier. Further, the capturing of the at least one content may be based on the common entropy position selection reference.

Further, at 608, the method 600 may include encrypting, using the first processing device, the common entropy position selection reference using the at least one encryption scheme.

Further, at 610, the method 600 may include generating, using the first processing device, an encrypted common entropy position reference based on the encrypting of the common entropy position selection reference.

Further, at 612, the method 600 may include transmitting, using the first communication device, the encrypted common entropy position reference to the at least one second user device.

Further, at 614, the method 600 may include receiving, using the second communication device, the encrypted common entropy position reference from the at least one second user device.

Further, at 616, the method 600 may include decrypting, using the second processing device, the encrypted common entropy position reference.

Further, at 618, the method 600 may include obtaining, using the second processing device, the common entropy position selection reference based on the decrypting of the encrypted common entropy position reference.

Further, at 620, the method 600 may include monitoring, using the second processing device, the cyclical synchronization counter based on the common entropy position selection reference. Further, the capturing of the at least one content may be based on the monitoring.

Figure 7:
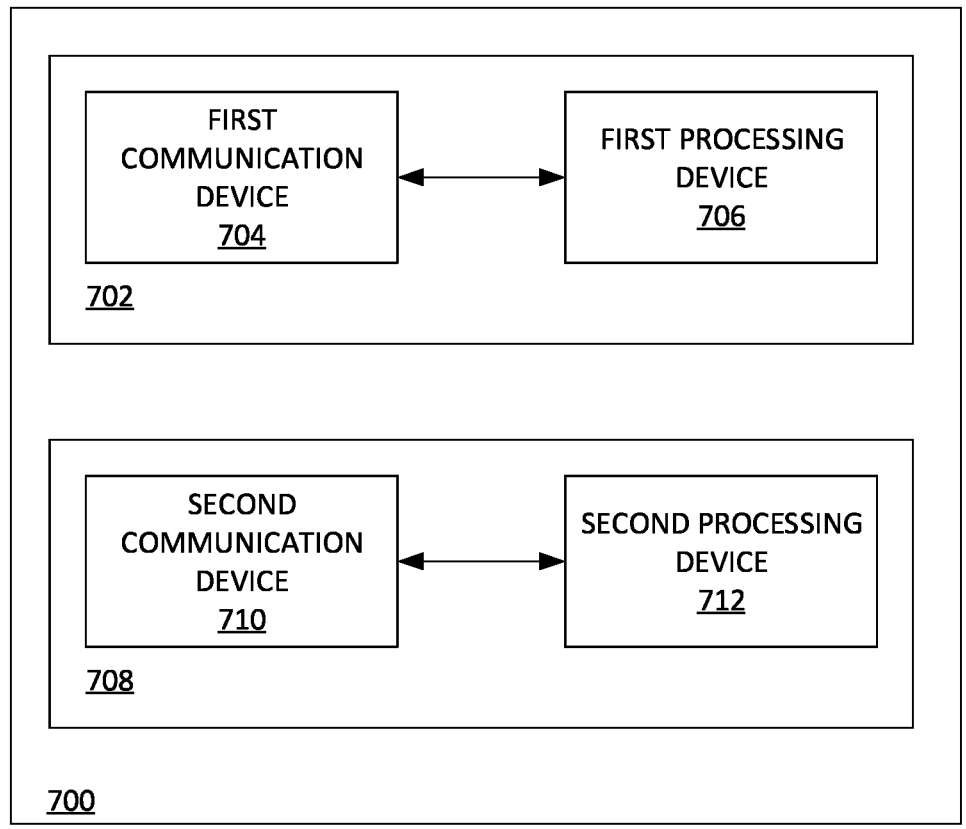
FIG. 7 is a block diagram of a system for providing durable forward confidentiality during communications between devices, in accordance with some embodiments.

FIG. 7 is a block diagram of a system 700 for providing durable forward confidentiality during communications between devices, in accordance with some embodiments. Further, the system 700 may include a first device 702 and a second device 708.

Further, the first device 702 may include a first communication device 704 and a first processing device 706.

Further, the first communication device 704 may be configured for receiving at least one ephemeral entropy source identifier of at least one ephemeral entropy source and at least one bit range identifier of at least one bit range associated with the at least one ephemeral entropy source from at least one first user device. Further, the first communication device 704 may be configured for transmitting a ciphertext to at least one second user device.

Further, the first processing device 706 may be communicatively coupled with the first communication device 704. Further, the first processing device 706 may be configured for encrypting the at least one ephemeral entropy source identifier and the at least one bit range identifier using at least one encryption scheme. Further, the first processing device 706 may be configured for generating the ciphertext based on the encrypting. Further, the first processing device 706 may be configured for identifying the at least one ephemeral entropy source and the at least one bit range based on the at least one ephemeral entropy source identifier and the at least one bit range identifier. Further, the first processing device 706 may be configured for capturing at least one content from at least one stream of the at least one ephemeral entropy source based on the identifying of the at least one ephemeral entropy source and the at least one bit range. Further, the first processing device 706 may be configured for generating a secret key using the at least one content. Further, the secret key may be used for at least one encrypting and decrypting one or more messages communicated between the at least one second user device and the at least one first user device.

Further, the second device 708 may include a second communication device 710 and a second processing device 712.

Further, the second communication device 710 may be configured for receiving the ciphertext from the at least one second user device.

Further, the second processing device 712 may be communicatively coupled with the second communication device 710. Further, the second processing device 712 may be configured for decrypting the ciphertext. Further, the second processing device 712 may be configured for obtaining the at least one ephemeral entropy source identifier and the at least one bit range identifier based on the decrypting. Further, the second processing device 712 may be configured for identifying the at least one ephemeral entropy source and the at least one bit range based on the at least one ephemeral entropy source identifier and the at least one bit range identifier. Further, the second processing device 712 may be configured for capturing the at least one content from the at least one stream of the at least one ephemeral entropy source based on the identifying of the at least one ephemeral entropy source and the at least one bit range. Further, the at least one ephemeral entropy source may be configured for outputting the at least one stream. Further, the second processing device 712 may be configured for generating the secret key using the at least one content. Further, the secret key may be used for at least one encrypting and decrypting the one or more messages communicated between the at least one first user device and the at least one second user device.

Further, in some embodiments, the first communication device 704 may be configured for receiving a communication request from the at least one first user device for establishing at least one communication link for communicating with at least one second user device. Further, the first communication device 704 may be configured for transmitting a plurality of ephemeral entropy sources to the at least one first user device. Further, the receiving of the at least one ephemeral entropy source identifier of the at least one ephemeral entropy source of the plurality of ephemeral entropy sources may be based on the transmitting of the plurality of ephemeral entropy sources. Further, the first processing device 706 may be configured for identifying the plurality of ephemeral entropy sources based on the communication request.

Further, in some embodiments, the at least one ephemeral entropy source may include at least one true random number generator (TRNG). Further, the at least one true random generator may be configured for generating the at least one stream with non-repeatable randomness. Further, the outputting of the at least one stream may be based on the generating of the at least one stream.

Further, in some embodiments, the at least one ephemeral entropy source may be associated with at least one bit rate. Further, the outputting of the at least one stream may include outputting the at least one stream with the at least one bit rate. Further, the at least one bit rate substantially equivalent to a maximum bit rate allowed by at least one channel used by the at least one ephemeral source for the outputting of the at least one stream.

Further, in some embodiments, the capturing of the at least one content may include passively capturing the at least one content from the at least one stream of the at least one ephemeral entropy source. Further, the passively capturing of the at least one content does not emit an effect to third-party observers.

Further, in some embodiments, the at least one ephemeral entropy source may include an active entropy source. Further, the active entropy source may be configured for generating the at least one stream. Further, the outputting of the at least one stream may be based on the generating of the at least one stream.

Further, in some embodiments, the at least one ephemeral entropy source may include a passive entropy source. Further, the passive entropy source may be configured for broadcasting the at least one stream using pervasive radio waves. Further, the outputting of the at least one stream may be based on the broadcasting.

Further, in some embodiments, the first processing device 706 may be configured for generating a first hash based on hashing the at least one content. Further, the first communication device 704 may be configured for transmitting the first hash to the at least one second user device. Further, the second communication device 710 may be configured for receiving the first hash from the at least one second user device. Further, the second processing device 712 may be configured for generating a second hash based on hashing the at least one content. Further, the second processing device 712 may be configured for comparing the first hash and the second hash. Further, the second processing device 712 may be configured for determining a match between the first hash and the second hash based on the comparing. Further, the generating of the secret key using the at least one content may be based on the determining of the match.

Further, in an embodiment, the second communication device 710 may be configured for transmitting the second hash to the at least one first user device. Further, the first communication device 704 may be configured for receiving the second hash from the at least one first user device. Further, the first processing device 706 may be configured for comparing the first hash and the second hash. Further, the first processing device 706 may be configured for determining a match between the first hash and the second hash based on the comparing of the first hash and the second hash. Further, the generating of the secret key using the at least one content may be based on the determining of the match.

Further, in some embodiments, the at least one ephemeral source may include a radio or satellite based source. Further, the first communication device 704 may be configured for transmitting cyclical synchronization counter information associated with a cyclical synchronization counter of the radio or satellite based source to the at least one first user device. Further, the first communication device 704 may be configured for receiving a common entropy position identifier associated with the cyclical synchronization counter from the at least one first user device. Further, the first communication device 704 may be configured for transmitting an encrypted common entropy position reference to the at least one second user device. Further, the first processing device 706 may be configured for determining a common entropy position selection reference associated with the cyclical synchronization counter based on the common entropy position identifier. Further, the capturing of the at least one content may be based on the common entropy position selection reference. Further, the first processing device 706 may be configured for encrypting the common entropy position selection reference using the at least one encryption scheme. Further, the first processing device 706 may be configured for generating the encrypted common entropy position reference based on the encrypting of the common entropy position selection reference. Further, the second communication device 710 may be configured for receiving the encrypted common entropy position reference from the at least one second user device. Further, the second processing device 712 may be configured for decrypting the encrypted common entropy position reference. Further, the second processing device 712 may be configured for obtaining the common entropy position selection reference based on the decrypting of the encrypted common entropy position reference. Further, the second processing device 712 may be configured for monitoring the cyclical synchronization counter based on the common entropy position selection reference. Further, the capturing of the at least one content may be based on the monitoring.

Figure 8:
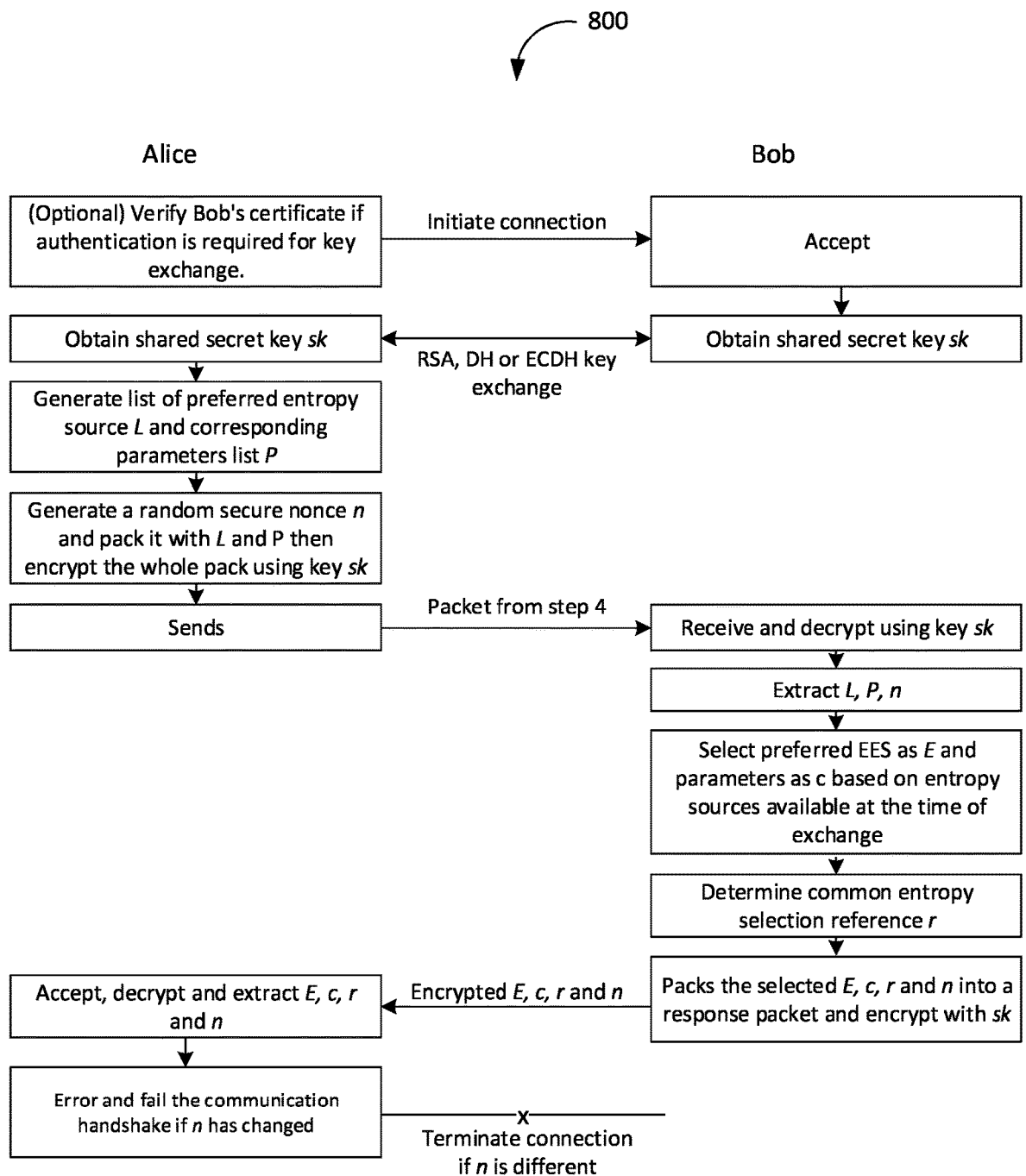
FIG. 8 is a flow diagram of a key establishment process for providing durable forward confidentiality during the communications between the devices, in accordance with some embodiments.

FIG. 8 is a flow diagram of a key establishment process 800 for providing durable forward confidentiality during the communications between the devices, in accordance with some embodiments.

Figure 9:
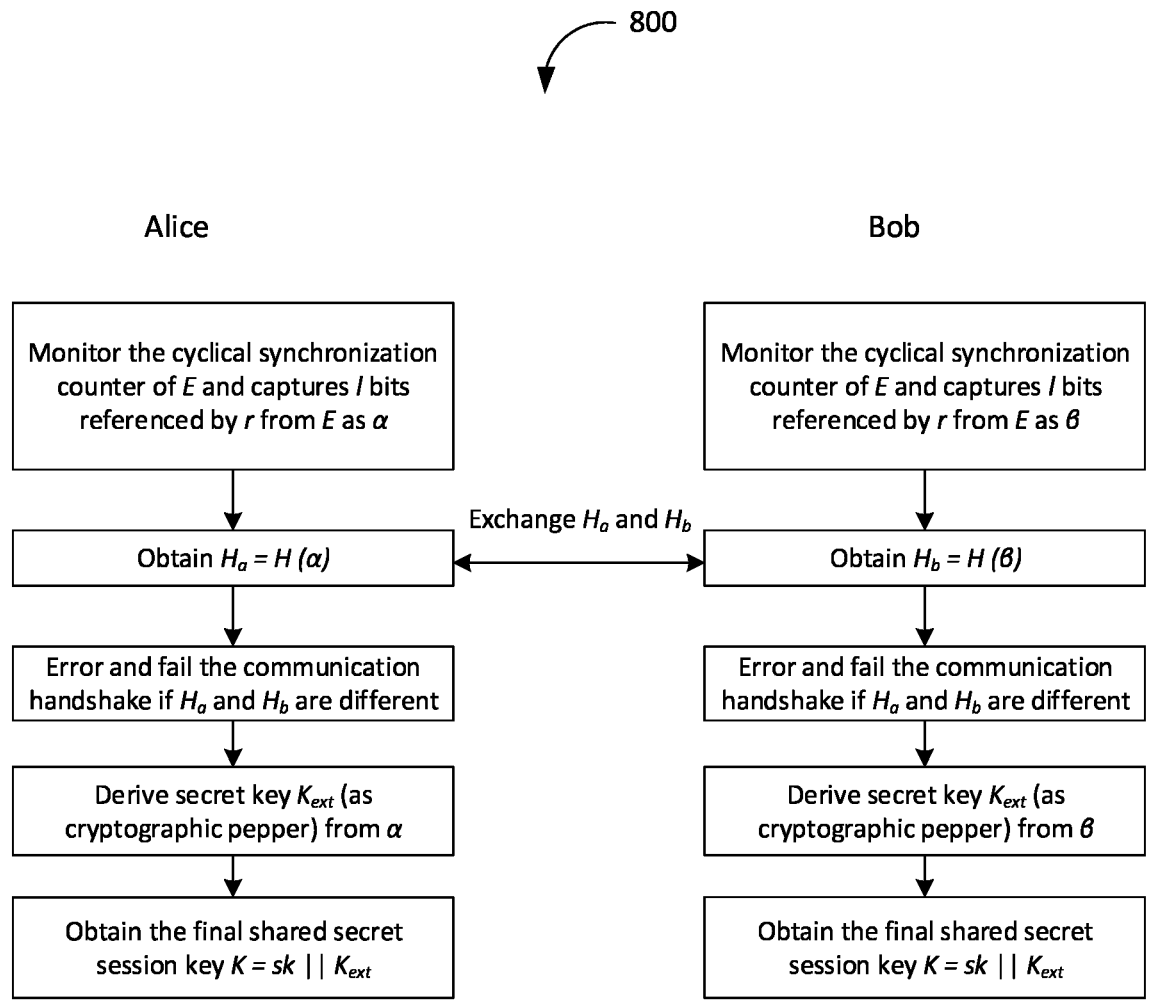
FIG. 9 is a continuation flow diagram of the key establishment process, in accordance with some embodiments.

FIG. 9 is a continuation flow diagram of the key establishment process 800, in accordance with some embodiments.

FIG. 10 is a table 1000 of notations, in accordance with some embodiments.

FIG. 11 is a table 1100 of entropy sources and attributes and characteristics of the entropy sources, in accordance with some embodiments.

FIG. 12 is the table 1100 of the entropy sources and the attributes and the characteristics of the entropy sources, in accordance with some embodiments.

Figure 13:
FIG. 13 is the table of the entropy sources and the attributes and the characteristics of the entropy sources, in accordance with some embodiments.

FIG. 13 is the table 1100 of the entropy sources and the attributes and the characteristics of the entropy sources, in accordance with some embodiments.

FIG. 14 illustrates a key establishment process 1400 for Internet based entropy sources for providing durable forward confidentiality during the communications between the devices, in accordance with some embodiments.

FIG. 15 illustrates the key establishment process 1400 for the Internet based entropy sources, in accordance with some embodiments.

FIG. 16 illustrates a key establishment process 1600 for radio or satellite based entropy sources for providing durable forward confidentiality during the communications between the devices, in accordance with some embodiments.

Figure 17:
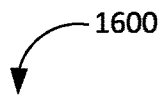
FIG. 17 illustrates the key establishment process for the radio or satellite based entropy sources, in accordance with some embodiments.

FIG. 17 illustrates the key establishment process 1600 for the radio or satellite based entropy sources, in accordance with some embodiments.

Figure 18:
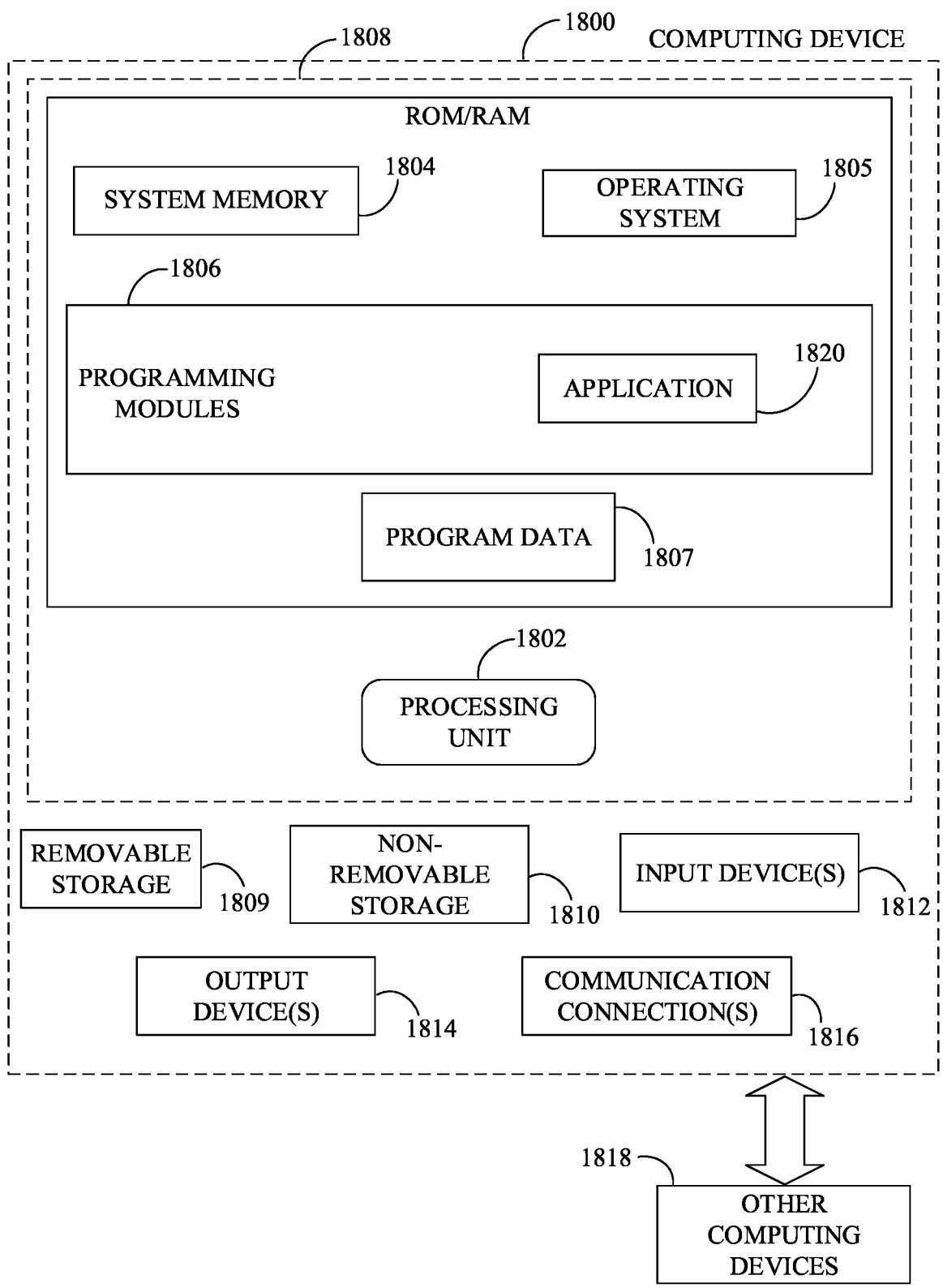
FIG. 18 is a block diagram of a computing device for implementing the methods disclosed herein, in accordance with some embodiments.

With reference to FIG. 18, a system consistent with an embodiment of the disclosure may include a computing device or cloud service, such as computing device 1800. In a basic configuration, computing device 1800 may include at least one processing unit 1802 and a system memory 1804. Depending on the configuration and type of computing device, system memory 1804 may comprise, but is not limited to, volatile (e.g. random-access memory (RAM)), non-volatile (e.g. read-only memory (ROM)), flash memory, or any combination. System memory 1804 may include operating system 1805, one or more programming modules 1806, and may include a program data 1807. Operating system 1805, for example, may be suitable for controlling computing device 1800's operation. Furthermore, embodiments of the disclosure may be practiced in conjunction with a graphics library, other operating systems, or any other application program and is not limited to any particular application or system. This basic configuration is illustrated in FIG. 18 by those components within a dashed line 1808.

Computing device 1800 may have additional features or functionality. For example, computing device 1800 may also include additional data storage devices (removable and/or non-removable) such as, for example, magnetic disks, optical disks, or tape. Such additional storage is illustrated in FIG. 18 by a removable storage 1809 and a non-removable storage 1810. Computer storage media may include volatile and non-volatile, removable and non-removable media implemented in any method or technology for storage of information, such as computer-readable instructions, data structures, program modules, or other data. System memory 1804, removable storage 1809, and non-removable storage 1810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1800. Any such computer storage media may be part of device 1800. Computing device 1800 may also have input device(s) 1812 such as a keyboard, a mouse, a pen, a sound input device, a touch input device, a location sensor, a camera, a biometric sensor, etc. Output device(s) 1814 such as a display, speakers, a printer, etc. may also be included. The aforementioned devices are examples and others may be used.

Computing device 1800 may also contain a communication connection 1816 that may allow device 1800 to communicate with other computing devices 1818, such as over a network in a distributed computing environment, for example, an intranet or the Internet. Communication connection 1816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1804, including operating system 1805. While executing on processing unit 1802, programming modules 1806 may perform processes including, for example, one or more stages of methods, algorithms, systems, applications, servers, databases as described above. The aforementioned process is an example, and processing unit 1802 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A method for providing durable forward confidentiality during communications between devices, the method comprising:
receiving, using a first communication device, at least one ephemeral entropy source identifier of at least one ephemeral entropy source and at least one bit range identifier of at least one bit range associated with the at least one ephemeral entropy source from at least one first user device;
encrypting, using a first processing device, the at least one ephemeral entropy source identifier and the at least one bit range identifier using at least one encryption scheme;
generating, using the first processing device, a ciphertext based on the encrypting;
transmitting, using the first communication device, the ciphertext to at least one second user device;
receiving, using a second communication device, the ciphertext from the at least one second user device;
decrypting, using a second processing device, the ciphertext;
obtaining, using the second processing device, the at least one ephemeral entropy source identifier and the at least one bit range identifier based on the decrypting;
identifying, using the second processing device, the at least one ephemeral entropy source and the at least one bit range based on the at least one ephemeral entropy source identifier and the at least one bit range identifier;
capturing, using the second processing device, at least one content from at least one stream of the at least one ephemeral entropy source based on the identifying of the at least one ephemeral entropy source and the at least one bit range, wherein the at least one ephemeral entropy source is configured for outputting the at least one stream;
generating, using the second processing device, a secret key using the at least one content, wherein the secret key is used for at least one encrypting and decrypting one or more messages communicated between the at least one first user device and the at least one second user device;
identifying, using the first processing device, the at least one ephemeral entropy source and the at least one bit range based on the at least one ephemeral entropy source identifier and the at least one bit range identifier;

capturing, using the first processing device, the at least one content from the at least one stream of the at least one ephemeral entropy source based on the at least one bit range based on the identifying of the at least one ephemeral entropy source and the at least one bit range; and generating, using the first processing device, the secret key using the at least one content, wherein the secret key is used for at least one encrypting and decrypting the one or more messages communicated between the at least one second user device and the at least one first user device.

2. The method of claim 1 further comprising:
receiving, using the first communication device, a communication request from the at least one first user device for establishing at least one communication link for communicating with at least one second user device;
identifying, using the first processing device, a plurality of ephemeral entropy sources based on the communication request; and
transmitting, using the first communication device, the plurality of ephemeral entropy sources to the at least one first user device, wherein the receiving of the at least one ephemeral entropy source identifier of the at least one ephemeral entropy source of the plurality of ephemeral entropy sources is based on the transmitting of the plurality of ephemeral entropy sources.

3. The method of claim 1, wherein the at least one ephemeral entropy source comprises at least one true random number generator (TRNG), wherein the at least one true random generator is configured for generating the at least one stream with non-repeatable randomness, wherein the outputting of the at least one stream is based on the generating of the at least one stream.

4. The method of claim 1, wherein the at least one ephemeral entropy source is associated with at least one bit rate, wherein the outputting of the at least one stream comprises outputting the at least one stream with the at least one bit rate, wherein the at least one bit rate substantially equivalent to a maximum bit rate allowed by at least one channel used by the at least one ephemeral source for the outputting of the at least one stream.

5. The method of claim 1, wherein the capturing of the at least one content comprises passively capturing the at least one content from the at least one stream of the at least one ephemeral entropy source, wherein the passively capturing of the at least one content does not emit an effect to third-party observers.

6. The method of claim 1, wherein the at least one ephemeral entropy source comprises an active entropy source, wherein the active entropy source is configured for generating the at least one stream, wherein the outputting of the at least one stream is based on the generating of the at least one stream.

7. The method of claim 1, wherein the at least one ephemeral entropy source comprises a passive entropy source, wherein the passive entropy source is configured for broadcasting the at least one stream using pervasive radio waves, wherein the outputting of the at least one stream is based on the broadcasting.

8. The method of claim 1 further comprising:
generating, using the first processing device, a first hash based on hashing the at least one content;
generating, using the second processing device, a second hash based on hashing the at least one content;
transmitting, using the first communication device, the first hash to the at least one second user device;
receiving, using the second communication device, the first hash from the at least one second user device;
comparing, using the second processing device, the first hash and the second hash; and
determining, using the second processing device, a match between the first hash and the second hash based on the comparing, wherein the generating of the secret key using the at least one content is further based on the determining of the match.

9. The method of claim 8 further comprising:
transmitting, using the second communication device, the second hash to the at least one first user device;
receiving, using the first communication device, the second hash from the at least one first user device;
comparing, using the first processing device, the first hash and the second hash; and
determining, using the first processing device, a match between the first hash and the second hash based on the comparing of the first hash and the second hash, wherein the generating of the secret key using the at least one content is further based on the determining of the match.

10. The method of claim 1, wherein the at least one ephemeral source comprises a radio or satellite based source, wherein the method further comprises:
transmitting, using the first communication device, cyclical synchronization counter information associated with a cyclical synchronization counter of the radio or satellite based source to the at least one first user device;
receiving, using the first communication device, a common entropy position identifier associated with the cyclical synchronization counter from the at least one first user device;
determining, using the first processing device, a common entropy position selection reference associated with the cyclical synchronization counter based on the common entropy position identifier, wherein the capturing of the at least one content is further based on the common entropy position selection reference;
encrypting, using the first processing device, the common entropy position selection reference using the at least one encryption scheme;
generating, using the first processing device, an encrypted common entropy position reference based on the encrypting of the common entropy position selection reference;
transmitting, using the first communication device, the encrypted common entropy position reference to the at least one second user device;
receiving, using the second communication device, the encrypted common entropy position reference from the at least one second user device;
decrypting, using the second processing device, the encrypted common entropy position reference;
obtaining, using the second processing device, the common entropy position selection reference based on the decrypting of the encrypted common entropy position reference; and
monitoring, using the second processing device, the cyclical synchronization counter based on the common entropy position selection reference, wherein the capturing of the at least one content is further based on the monitoring.

11. A system for providing durable forward confidentiality during communications between devices, the system comprising:
- a first device comprising:
  - a first communication device configured for:
    - receiving at least one ephemeral entropy source identifier of at least one ephemeral entropy source and at least one bit range identifier of at least one bit range associated with the at least one ephemeral entropy source from at least one first user device; and
    - transmitting a ciphertext to at least one second user device; and
  - a first processing device communicatively coupled with the first communication device, wherein the first processing device is configured for:
    - encrypting the at least one ephemeral entropy source identifier and the at least one bit range identifier using at least one encryption scheme;
    - generating the ciphertext based on the encrypting;
    - identifying the at least one ephemeral entropy source and the at least one bit range based on the at least one ephemeral entropy source identifier and the at least one bit range identifier;
    - capturing at least one content from at least one stream of the at least one ephemeral entropy source based on the identifying of the at least one ephemeral entropy source and the at least one bit range; and
    - generating a secret key using the at least one content, wherein the secret key is used for at least one encrypting and decrypting one or more messages communicated between the at least one second user device and the at least one first user device; and
- a second device comprising:
  - a second communication device configured for receiving the ciphertext from the at least one second user device; and
  - a second processing device communicatively coupled with the second communication device, wherein the second processing device is configured for:
    - decrypting the ciphertext;
    - obtaining the at least one ephemeral entropy source identifier and the at least one bit range identifier based on the decrypting;
    - identifying the at least one ephemeral entropy source and the at least one bit range based on the at least one ephemeral entropy source identifier and the at least one bit range identifier;
    - capturing the at least one content from the at least one stream of the at least one ephemeral entropy source based on the identifying of the at least one ephemeral entropy source and the at least one bit range, wherein the at least one ephemeral entropy source is configured for outputting the at least one stream; and
    - generating the secret key using the at least one content, wherein the secret key is used for at least one encrypting and decrypting the one or more messages communicated between the at least one first user device and the at least one second user device.

12. The system of claim 11, wherein the first communication device is further configured for:
- receiving a communication request from the at least one first user device for establishing at least one communication link for communicating with at least one second user device; and
- transmitting a plurality of ephemeral entropy sources to the at least one first user device, wherein the receiving of the at least one ephemeral entropy source identifier of the at least one ephemeral entropy source of the plurality of ephemeral entropy sources is based on the transmitting of the plurality of ephemeral entropy sources, wherein the first processing device is further configured for identifying the plurality of ephemeral entropy sources based on the communication request.

13. The system of claim 11, wherein the at least one ephemeral entropy source comprises at least one true random number generator (TRNG), wherein the at least one true random generator is configured for generating the at least one stream with non-repeatable randomness, wherein the outputting of the at least one stream is based on the generating of the at least one stream.

14. The system of claim 11, wherein the at least one ephemeral entropy source is associated with at least one bit rate, wherein the outputting of the at least one stream comprises outputting the at least one stream with the at least one bit rate, wherein the at least one bit rate substantially equivalent to a maximum bit rate allowed by at least one channel used by the at least one ephemeral source for the outputting of the at least one stream.

15. The system of claim 11, wherein the capturing of the at least one content comprises passively capturing the at least one content from the at least one stream of the at least one ephemeral entropy source, wherein the passively capturing of the at least one content does not emit an effect to third-party observers.

16. The system of claim 11, wherein the at least one ephemeral entropy source comprises an active entropy source, wherein the active entropy source is configured for generating the at least one stream, wherein the outputting of the at least one stream is based on the generating of the at least one stream.

17. The system of claim 11, wherein the at least one ephemeral entropy source comprises a passive entropy source, wherein the passive entropy source is configured for broadcasting the at least one stream using pervasive radio waves, wherein the outputting of the at least one stream is based on the broadcasting.

18. The system of claim 11, wherein the first processing device is further configured for generating a first hash based on hashing the at least one content, wherein the first communication device is further configured for transmitting the first hash to the at least one second user device, wherein the second communication device is further configured for receiving the first hash from the at least one second user device, wherein the second processing device is further configured for:
- generating a second hash based on the hashing the at least one content;
- comparing the first hash and the second hash; and
- determining a match between the first hash and the second hash based on the comparing, wherein the generating of the secret key using the at least one content is further based on the determining of the match.

19. The system of claim 18, wherein the second communication device is further configured for transmitting the second hash to the at least one first user device, wherein the first communication device is further configured for receiving the second hash from the at least one first user device, wherein the first processing device is further configured for:

comparing the first hash and the second hash; and determining a match between the first hash and the second hash based on the comparing of the first hash and the second hash, wherein the generating of the secret key using the at least one content is further based on the determining of the match.

20. The system of claim 11, wherein the at least one ephemeral source comprises a radio or satellite based source, wherein the first communication device is further configured for:

transmitting cyclical synchronization counter information associated with a cyclical synchronization counter of the radio or satellite based source to the at least one first user device;

receiving a common entropy position identifier associated with the cyclical synchronization counter from the at least one first user device; and transmitting an encrypted common entropy position reference to the at least one second user device, wherein the first processing device is further configured for:

determining a common entropy position selection reference associated with the cyclical synchronization counter based on the common entropy position identifier, wherein the capturing of the at least one content is further based on the common entropy position selection reference;

encrypting the common entropy position selection reference using the at least one encryption scheme; and generating the encrypted common entropy position reference based on the encrypting of the common entropy position selection reference, wherein the second communication device is further configured for receiving the encrypted common entropy position reference from the at least one second user device, wherein the second processing device is further configured for:

decrypting the encrypted common entropy position reference;

obtaining the common entropy position selection reference based on the decrypting of the encrypted common entropy position reference; and monitoring the cyclical synchronization counter based on the common entropy position selection reference, wherein the capturing of the at least one content is further based on the monitoring.

* * * * *